United States Patent
Franko, Sr.

(10) Patent No.: US 6,811,640 B2
(45) Date of Patent: Nov. 2, 2004

(54) ROLL-TO-ROLL METHOD OF CREATING EXTENDED TEXT LABELS

(75) Inventor: Joseph D. Franko, Sr., Ham Lake, MN (US)

(73) Assignee: Quality Assured Enterprises, Inc., Minnetonka, MN (US)

(*) Notice: Subject to any disclaimer, the term of this patent is extended or adjusted under 35 U.S.C. 154(b) by 312 days.

(21) Appl. No.: 10/177,354

(22) Filed: Jun. 21, 2002

(65) Prior Publication Data

US 2003/0234073 A1 Dec. 25, 2003

(51) Int. Cl.$^7$ .............................. B32B 31/18; B31D 1/02
(52) U.S. Cl. .................. 156/204; 156/201; 156/227; 156/256; 156/269; 156/277
(58) Field of Search .................. 156/199, 200, 156/201, 211, 227, 250, 256, 261, 269, 270, 277, DIG. 47, DIG. 49; 428/40.1, 41.8, 41.7, 42.1, 125, 126; 283/81, 94, 100, 101, 106; 40/299.01, 360, 638, 672; 270/8, 9, 5.02, 20.1, 21.1, 52.02, 52.08; 226/2, 4

(56) References Cited

U.S. PATENT DOCUMENTS

| | | |
|---|---|---|
| 4,094,438 A | 6/1978 | Neubauer |
| 4,323,608 A | 4/1982 | Denny et al. |
| 4,592,572 A | 6/1986 | Instance |
| 4,744,161 A | 5/1988 | Instance |
| 4,849,043 A | 7/1989 | Instance |
| 4,850,613 A | 7/1989 | Instance |
| 4,933,043 A | 6/1990 | Instance |
| 5,121,585 A | 6/1992 | Focke et al. |
| 5,207,746 A | 5/1993 | Jones |
| 5,222,766 A | 6/1993 | Instance |
| RE34,366 E | 9/1993 | Instance |
| 5,259,906 A | 11/1993 | Poplawski et al. |
| 5,264,265 A | 11/1993 | Kaufmann |
| 5,403,636 A * | 4/1995 | Crum .......................... 428/41.8 |
| 5,490,692 A * | 2/1996 | Howard ........................ 283/81 |
| 5,582,888 A * | 12/1996 | Volkert ....................... 428/40.1 |
| 5,766,716 A * | 6/1998 | Barry .......................... 428/40.1 |
| 6,027,598 A * | 2/2000 | Anderson .................... 156/253 |
| 6,730,185 B2 * | 5/2004 | Kennedy ...................... 156/230 |
| 2001/0022213 A1 * | 9/2001 | Instance ....................... 156/268 |
| 2003/0025323 A1 * | 2/2003 | Unglert et al. ................ 283/106 |

FOREIGN PATENT DOCUMENTS

| | | | | |
|---|---|---|---|---|
| DE | 10134867 A1 * | 2/2003 | | B31D/1/02 |
| EP | 0232054 B1 * | 12/1989 | | B31D/1/02 |

* cited by examiner

Primary Examiner—Gladys JP Corcoran
(74) Attorney, Agent, or Firm—Walter E. Roloff

(57) ABSTRACT

A roll-to-roll method of creating extended text labels includes introducing first and second web materials to a continuous, in-line, single pass, roll-to-roll press in a machine direction. In the machine direction of the press, selected graphics are printed on the first and second web materials. The first web material is selectively cut to create a foldable portion therein, with the foldable portion being in a substantially transversely folded relationship relative to the machine direction. The foldable portion of the first web material is then folded, and the first web material including the foldable portion and the second web material are joined to form a married web. The married web is then selectively cut such that at least one extended text label is created therewithin.

9 Claims, 3 Drawing Sheets

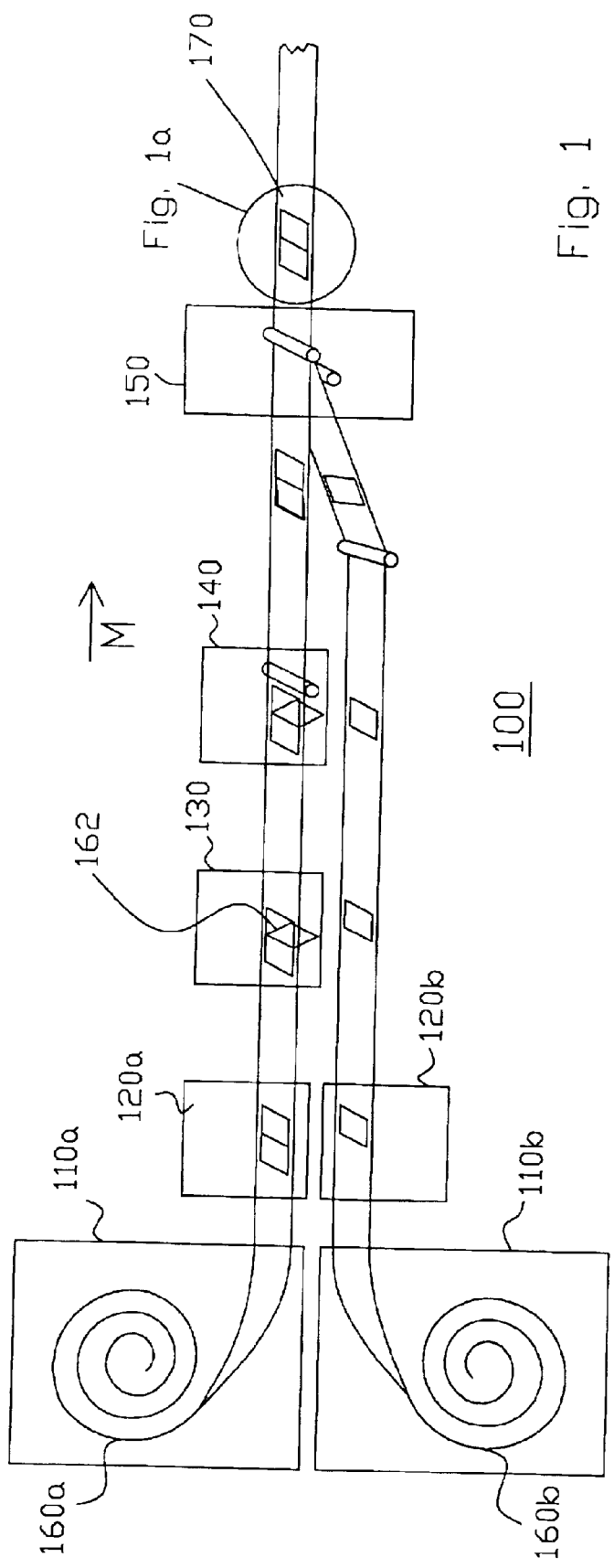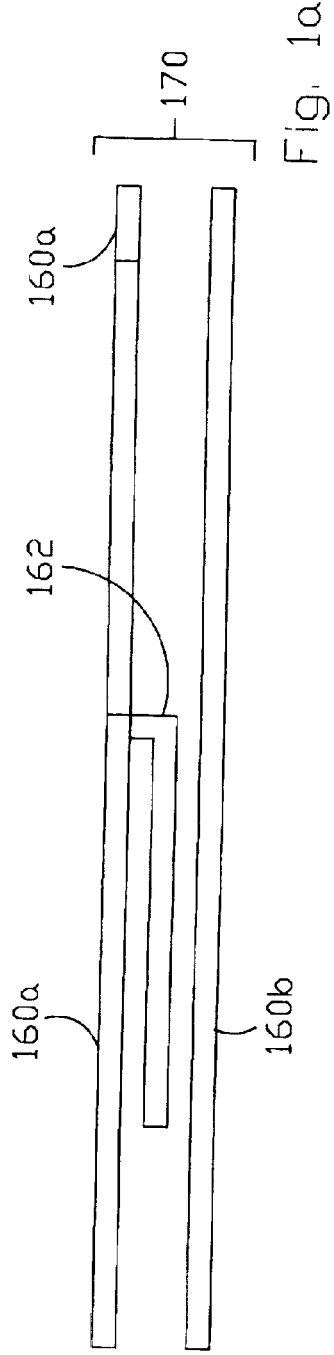

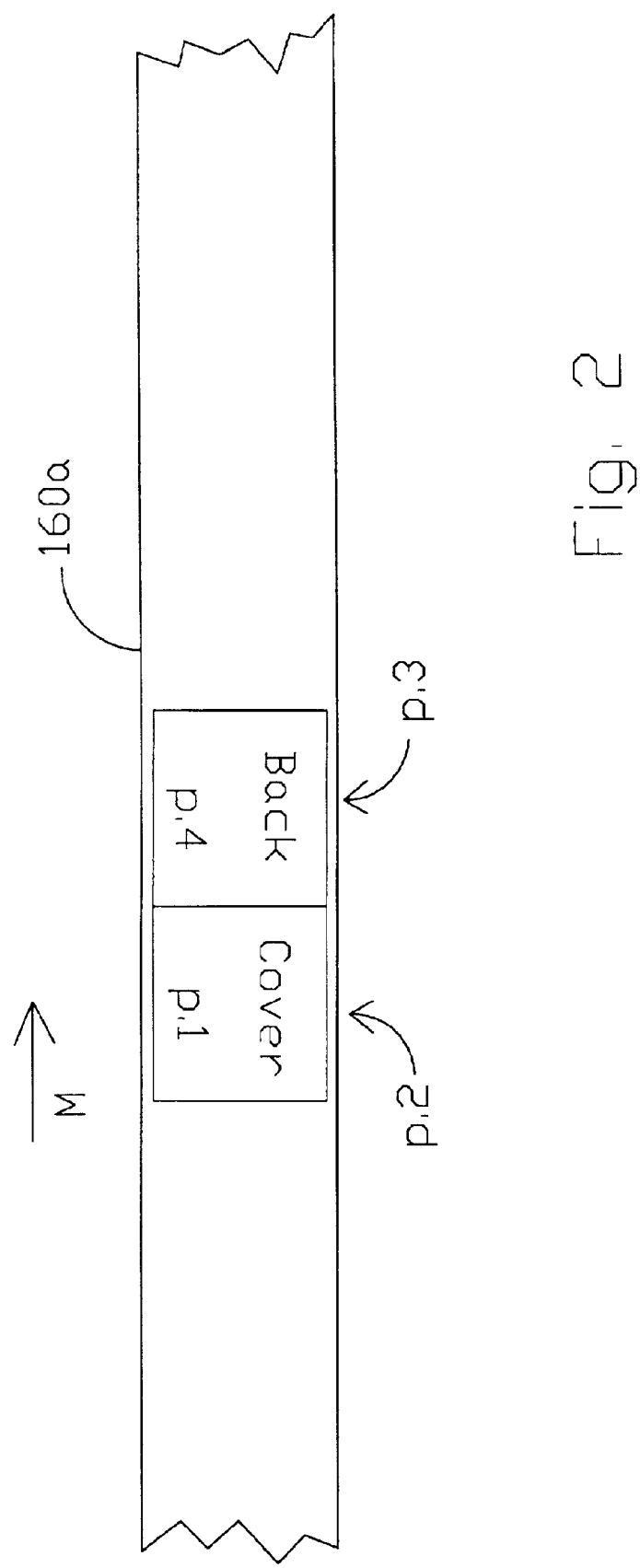

ROLL-TO-ROLL METHOD OF CREATING EXTENDED TEXT LABELS

FIELD OF THE INVENTION

The present invention relates generally to methods of creating labels for product containers. The invention relates specifically to a roll-to-roll method of creating extended text or "booklet" labels for product containers which are labeled by roll-fed automatic labeling machines.

BACKGROUND OF THE INVENTION

In the printing arts, and in particular in the commercial printed label art for labeling and decorating consumer products, there exists a continual demand for labels and decorations which not only appeal to consumers, but also bear ever increasing amounts of printed information. For example, labels for identification of consumer health care and pharmaceutical products are often required by governmental regulations to describe in painstaking detail their compositions, ingredients, and uses. As new food and drug laws are passed, regulations require the inclusion of increasing amounts of information.

To provide increased printed information on labels, various forms of so-called "extended text" (or, alternatively, "extended content" or "expanded content") labels have been proposed. One such extended text label type that has gained wide popularity is the booklet type label, where in its simplest form a base ply is joined to a cover ply via an adhesive coupling or "hinge" between the two plies. An example of this type of label is disclosed in U.S. Pat. No. 5,264,265 issued to Kaufmann, entitled "PEEL-BACK RE-SEALABLE MULTI-PLY LABEL".

Aside from the aforementioned patented labels, other extended text labels have been proposed which comprise multiple plies, thereby providing several booklet "pages".

Booklet labels are commonly provided in roll form for product labeling. The roll of labels is introduced to an automatic label application machine in a container assembly line. As product containers pass downstream in the line, the booklet labels are individually dispensed from the roll and are individually adhered to each container.

Creation of booklet labels in roll form has heretofore mainly utilized so-called "pick-and-place" methods. In an exemplary pick-and-place method, booklets are individually created in off-line, separate press/folding operations (e.g., gate folders). The booklets so created off-line are then loaded into a magazine of the pick-and-place equipment. As a base ply web runs under the magazine in a lengthwise "machine direction" as known in the art, the individual booklets in the magazine are sequentially ejected onto and adhesively joined or "married" to the base ply web. This marrying of the booklet to the base ply web is commonly achieved by way of a so-called "overlaminate" that functions to adhere the booklet to the base ply web, and also provides both a booklet hinge and resealable closure.

Drawbacks of pick-and-place methods include an inability to ensure color consistency and registration between separate press operations and variable printing processes, possibilities of mislabeling due to incorrectly loading booklets associated with a different label "family" (e.g., mismatched barcodes), and generally increased expense and diminished efficiency in operation. Furthermore, pick-and-place techniques have certain web material limitations. For example, it is recognized in the art that it is not possible to successfully create, off-line, a useable gate-folded booklet from film material. Film materials have a physical "memory" which tend to maintain original shapes and thus do not effectively maintain a folded state.

As an alternative to utilization of pick-and-place methods, a roll-to-roll method (i.e., an in-line, single pass operation) has been employed, where a so-called "plow folding" technique folds the web parallel to the machine direction in creation of booklets. In most instances, this plow folding results in a booklet label having a hinge or opening that is substantially horizontally oriented on the product container, once applied thereto. However, in most cases, a vertically oriented booklet is desired. Thus, such known plow folding methods have been incapable of providing material folds that are substantially perpendicular or transverse to the machine direction in accordance with a booklet label customer's specifications.

Therefore, there exists a need for an in-line, single pass, roll-to-roll method of creating extended text or "booklet" labels that eliminates the drawbacks of known pick-and-place and plow folding methods.

SUMMARY OF THE INVENTION

An object of the present invention is to provide an in-line, single pass, roll-to-roll method of creating extended text labels that is capable of folding web material substantially transversely or perpendicularly to the machine direction.

Another object of the present invention is to provide an in-line, single pass, roll-to-roll method of creating extended text labels that assures color consistency and registration in extended text label production.

Another object of the present invention is to provide an in-line, single pass, roll-to-roll method of creating extended text labels that assists in preventing mislabeling.

A further object of the present invention is to decrease expense and increase efficiency in extended text label production.

A yet further object of the present invention is to create extended text labels in an in-line, single pass, roll-to-roll method, utilizing any desired web materials such as films.

In accordance with the present invention, a roll-to-roll method of creating extended text labels includes introducing first and second web materials to a continuous, in-line, single pass, roll-to-roll press in a machine direction. In the machine direction of the press, selected graphics are printed on the first and second web materials. The first web material is selectively cut to create a foldable portion therein, with the foldable portion being in a substantially transversely folded relationship relative to the machine direction. The foldable portion of the first web material is then folded, and the first web material including the foldable portion and the second web material are joined to form a married web. The married web is then selectively cut such that at least one extended text label is created therewithin.

BRIEF DESCRIPTION OF THE DRAWINGS

FIG. 1 is a schematic diagram of a roll-to-roll method of creating extended text labels in accordance with the present invention.

FIG. 1a is a magnified cross-sectional view of an indicated portion of FIG. 1.

FIG. 2 is a top view representation of a component of FIG. 1.

DETAILED DESCRIPTION OF THE INVENTION

Figure 3:
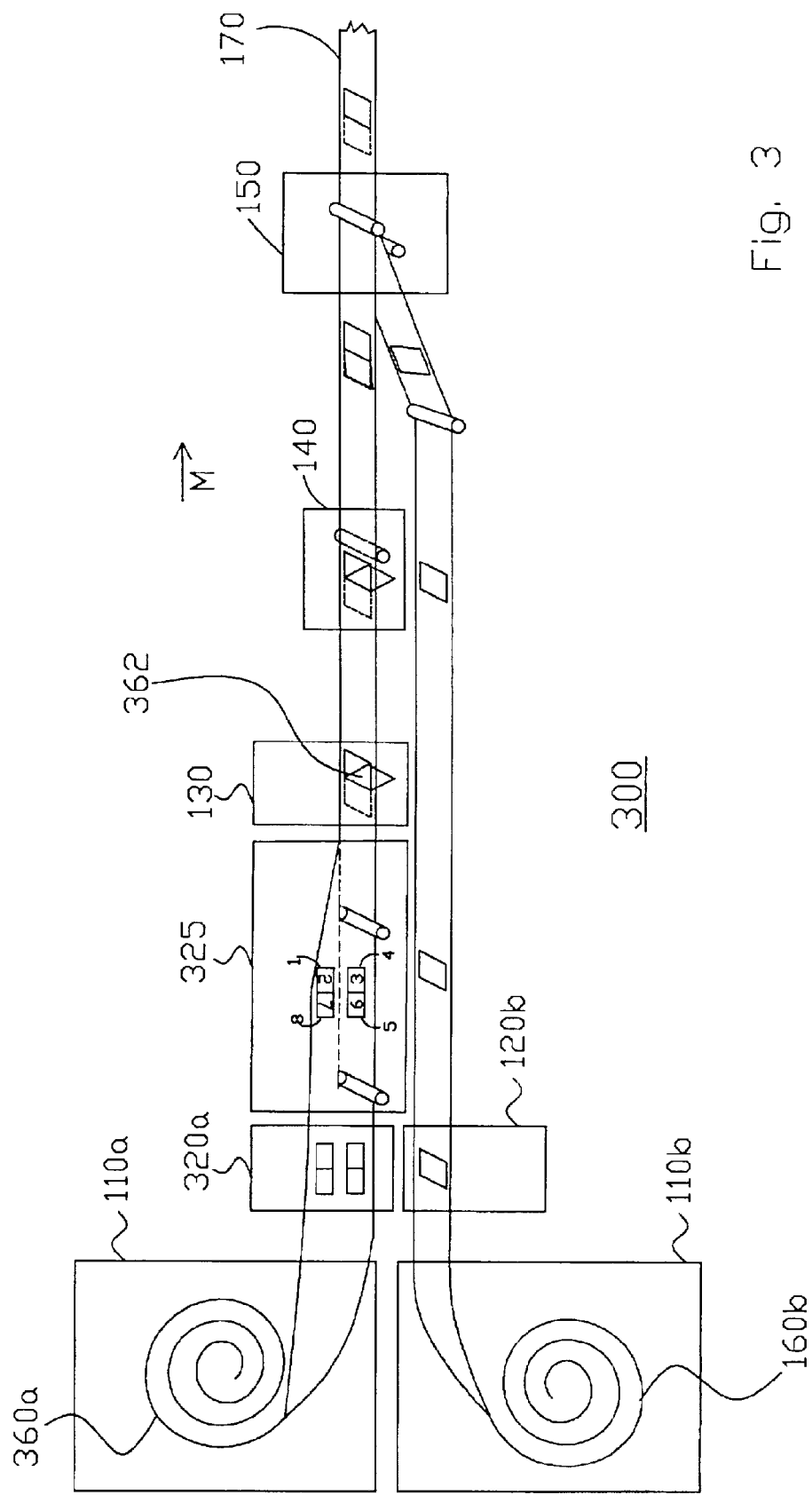
FIG. 3 is a schematic diagram of an alternative embodiment of a roll-to-roll method of creating extended text labels in accordance with the present invention.

Referring to FIG. 1, there depicted in transparent schematic fashion is an exemplary roll-to-roll web press 100 for creating extended text labels.

Press 100 includes unwind units 110a and 110b, first and second printing units 120a and 120b, a web cutting unit 130, a folding station 140, and a web joining unit 150.

It is to be understood that press 100 is selectively capable of providing a variable number of printing units for application and drying of pigmented inks, coatings, and adhesives. As understood by those of ordinary skill in the printing arts, the exemplary multi-unit press 100 may be any suitable narrow- or wide-web press such as a flexographic, letterpress, gravure, screen, or offset press. Such presses are commercially available from, for example, Comco International of Milford, Ohio, or Mark Andy Inc. of St. Louis, Mo.

Specifically in FIG. 1, a first web material 160a is supplied in a conventional roll form to press 100 at unwind unit 110a, and in a lengthwise machine direction M thereto. Concurrently, a second web material 160b is also supplied in a conventional roll form to press 100 at unwind unit 110b, also in lengthwise machine direction M. Web materials 160a–b may be any suitable in-line web material such as paper, a plastic, a foil, a so-called "unsupported" web material, a pressure-sensitive adhesive laminate, or a laminate or composite construction of any such materials. Additionally, as used herein, "web materials" may specifically also denote film, polypropylene, polyethylene, polyester, polyvinylchloride, polystyrene, and ethylene vinyl acetate.

Unwind units 110a–b pass web materials 160a–b, respectively, to first printing units 120a and 120b, respectively, where selected graphics may be printed thereon. FIG. 2 more clearly depicts, in isolation, web material 160a with the selected graphics so printed, immediately after passing through printing unit 120a.

Web material 160a bearing selected graphics is then passed to web cutting unit 130. At cutting unit 130, material 160a may be selectively die cut and/or "slugged" (i.e., removal of material in punch-press fashion) to create a foldable portion 162 therein.

Web material 160a, thus bearing selected graphics and having foldable portion 162, is then passed to folding station 140. Folding station 140 operates to urge foldable portion 162 into an overall transversely or perpendicularly folded relationship, relative to machine direction M, with web material 160a. Folding station 140 may be any suitable device for effecting a fold in a web material such as, for example, a roller, turn bar, plate, brush, air jet, vacuum, or a combination of such elements.

It should be particularly understood and appreciated that the steps of the present invention described herethroughout provide a technique for folding the web substantially transverse to the machine direction. Such substantially transverse or perpendicular folding has heretofore not been achievable while maintaining a continuous in-line, single pass, roll-to-roll process.

Materials 160a–b then are joined to form a "married" web at web joining unit 150. The married webs must be held in print-to-print and web-to-web registration, such that the married webs and now folded, foldable portion 162 maintain running registration with each other as may be required. This running registration provides proper overall registration for final die cutting steps in creation of individual booklet labels, as will be described.

Web joining unit 150 may be, for example, any suitable web laminating device such as a "nip roller" as is known in the art.

Although not shown in the figure, it is to be understood that materials 160a and/or 160b may receive a selected deposition of adhesive for use as a hinge, closure, or both, for the individual booklets, or for temporarily maintaining registration for the web marrying step.

Although also not depicted in FIG. 1, married web 170 may then be introduced to a final converting unit (such as, e.g., a die cutter) for individual booklet label creation within married web 170, and then re-wound into a finished product roll.

It is to be appreciated that running speeds of materials 160a and 160b in machine direction M may be adjusted to ensure proper print-to-print and web-to-web registration.

FIG. 3 is a schematic diagram of a press 300, showing an alternative embodiment of a roll-to-roll method of creating extended text labels in accordance with the present invention. This exemplary alternative embodiment of the invention provides more booklet label pages as may be desired. It is to be noted that in FIG. 1 and in FIG. 3, similar components are identified by similar reference numerals and descriptions.

With reference to FIG. 3, first web material 360a is supplied in a conventional roll form to press 300 at unwind unit 110a in lengthwise machine direction M. Concurrently, second web material 160b is also supplied as aforesaid at unwind unit 110b, also in the direction M.

Unwind units 110a–b pass web materials 360a and 160b, respectively, to first printing units 320a and 120b, respectively, for printing of selected graphics thereon.

Web material 360a bearing selected graphics and/or adhesive is then passed to plow folding station 325, where it is plow folded onto itself substantially parallel to the machine direction M; this will, in finished booklet label form, result in additional booklet pages relative to the labels of FIG. 1. Plow folding station 325 may be any suitable device for effecting a fold in a web as aforementioned. Material 360a then continues to unit 130 in the aforedescribed fashion.

Web material 360a bearing selected graphics and/or adhesive, and having been plow folded substantially parallel to machine direction M, is then passed to web cutting unit 130, where material 360a is selectively cut to create a foldable portion 362 therein.

Material 360a is then passed to folding station 140. Folding station 140, as aforesaid, operates to urge foldable portion 362 into an overall transverse or perpendicular folded relationship, relative to direction M, with web material 360a.

Materials 360a and 160b are then joined at web joining unit 150, to create a married web 170. Married web 170 is then introduced to a final converting unit (again, not depicted) for individual booklet label creation within married web 170, and is then re-wound into a finished product roll.

While the present invention has been particularly shown and described with reference to the accompanying figures, it will be understood, however, that other modifications thereto are of course possible, all of which are intended to be within the true spirit and scope of the present invention. It should be appreciated that components of the invention aforedescribed may be substituted for other suitable components for achieving desired similar results, or that various accessories may be added thereto.

It is to be particularly appreciated by the skilled artisan that roll-to-roll booklets having a transversely or perpendicularly folded hinge (i.e., a hinge crated by way of a simple material "fold-over") have heretofore been possible only through off-line and pick-and-place methods, which suffer the aforementioned drawbacks. The present invention, however, provides the same substantially transverse or perpendicular fold-over hinge in a continuous, in-line, single pass, roll-to-roll operation.

It is to be understood in general that any suitable alternatives or additions may be employed to provide the roll-to-roll method of creating extended text labels. Thus, for example, the embodiments of FIGS. 1 and 3 may be employed in various combinations and configurations with each other. Further, any booklet size could ultimately be provided depending upon selected folding of the pre-married webs. Additionally, the married webs could receive an overlaminate that functions, as aforedescribed, to adhere the booklet to the base ply web, and that also provides both a booklet hinge and resealable closure.

It is also to be appreciated that additional material webs could be introduced to press 100 in the continuous, in-line, single pass, roll-to-roll manufacturing process described herein, for provision of more booklet pages and/or increased booklet label output (e.g., one-across versus multiple across label yields).

Lastly, the choice, of course, of specific components of press 100 is all a matter of design choice depending upon intended uses of the present invention.

Accordingly, these and other various changes or modifications in form and detail of the present invention may also be made therein, again without departing from the true spirit and scope of the invention as defined by the appended claims.

What is claimed is:

1. A roll-to-roll method of creating extended text labels, comprising the steps of:
   providing a first web material and a second web material, each in a machine direction;
   selectively printing graphics on said first web material and said second web material;
   selectively cutting said first web material in said substantially transversely folded relationship to create a foldable portion therein, said foldable portion being in a substantially transversely folded relationship relative to said machine direction;
   folding said foldable portion of said first web material;
   joining said first web material including said folded foldable portion and said second web material to form a married web; and
   selectively cutting said married web such that at least one extended text label is created thereby.

2. The method of claim 1, wherein said first web material is an unsupported web material.

3. The method of claim 1, wherein said second web material is a pressure-sensitive adhesive web material.

4. The method of claim 1, further comprising the step of overlaminating said married web.

5. A roll-to-roll method of creating extended text labels, comprising the steps of:
   providing a first web material and a second web material, each in a machine direction;
   selectively printing graphics on said first web material and said second web material;
   plow folding said first web in said machine direction;
   selectively cutting said first web material to create a foldable portion therein, said foldable portion being in a substantially transversely folded relationship relative to said machine direction;
   folding said foldable portion of said first web material;
   joining said first web material in said substantially transversely folded relationship including said folded foldable portion and said second web material to form a married web; and
   selectively cutting said married web such that at least one extended text label is created thereby.

6. The method of claim 5, wherein said first web material is an unsupported web material.

7. The method of claim 5, wherein said second web material is a pressure-sensitive adhesive web material.

8. The method of claim 5, further comprising the step of overlaminating said married web.

9. A roll-to-roll method of creating extended text labels, comprising the steps of:
   providing a first web material and a second web material, each in a machine direction;
   selectively printing graphics on said first web material and said second web material;
   providing a selected print-to-print and web-to-web registration, such that running registration is maintained relative to said web materials;
   selectively slugging said first web material to create a foldable portion therein, said foldable portion being in a substantially transversely folded relationship relative to said machine direction;
   folding said foldable portion of said first web material;
   joining said first web material including said folded foldable portion and said second web material to form a married web; and
   selectively cutting said married web such that at least one extended text label is created thereby.

* * * * *

UNITED STATES PATENT AND TRADEMARK OFFICE
CERTIFICATE OF CORRECTION

PATENT NO. : 6,811,640 B2
DATED : November 2, 2004
INVENTOR(S) : Joseph D. Franko, Sr.

It is certified that error appears in the above-identified patent and that said Letters Patent is hereby corrected as shown below:

Title page,
Item [74], *Attorney, Agent or Firm*, "Walter E. Roloff" should read -- Walter K. Roloff --.

Signed and Sealed this

First Day of February, 2005

JON W. DUDAS
*Director of the United States Patent and Trademark Office*